United States Patent
Milbar

(10) Patent No.: US 6,985,537 B1
(45) Date of Patent: Jan. 10, 2006

(54) SYMBOL SELF SYNCHRONOUS INTERLEAVING METHOD AND APPARATUS FOR OFDM-BASED COMMUNICATION SYSTEM

(75) Inventor: Marek Milbar, Philadelphia, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 521 days.

(21) Appl. No.: 09/396,056

(22) Filed: Sep. 15, 1999

(51) Int. Cl.
H04L 27/28 (2006.01)
H04L 23/02 (2006.01)

(52) U.S. Cl. ...................................... 375/265; 370/344
(58) Field of Classification Search ................. 375/265; 370/344, 232, 487, 536; 714/792
See application file for complete search history.

(56) References Cited

U.S. PATENT DOCUMENTS

| 5,903,546 | A | * | 5/1999 | Ikeda et al. | 370/232 |
| 5,949,796 | A | * | 9/1999 | Kumar | 370/487 |
| 6,353,637 | B1 | * | 3/2002 | Mansour et al. | 370/536 |

FOREIGN PATENT DOCUMENTS

| EP | 0 800 287 A2 | 10/1997 |
| WO | WO 98/21832 | 5/1998 |

* cited by examiner

*Primary Examiner*—Vivian Chin
*Assistant Examiner*—Lewis G. West

(57) ABSTRACT

An interleaving method and apparatus is disclosed for an in-band on-channel (IBOC) digital audio broadcasting (DAB) system. The disclosed interleaver method and apparatus utilize a convolutional interleaver having a row size equal to one OFDM symbol and a time span of arbitrary size. A structured memory block is utilized in the de-interleaver at the receiver having a row size of one OFDM symbol (the number of active sub-carriers in the applicable sub-band of the IBOC system). The self-synchronizing nature of the present invention permits a receiver in an OFDM-based IBOC system to sort the scrambled blocks and descramble the received symbols according to its own frame count, without regard to the frame count of the transmitter. The disclosed interleaver method and apparatus does not require interleaver synchronization between the transmitter and receiver. In one implementation, separate convolutional encoders and convolutional interleavers are applied to each sub-band in a multi-stream structure to provide independent error spreading for each sub-band.

20 Claims, 3 Drawing Sheets

SYMBOL SELF SYNCHRONOUS INTERLEAVING METHOD AND APPARATUS FOR OFDM-BASED COMMUNICATION SYSTEM

FIELD OF THE INVENTION

The present invention relates generally to digital audio broadcasting (DAB) and other types of digital communication systems, and more particularly, to symbol interleavers for such DAB and other types of digital communication systems.

BACKGROUND OF THE INVENTION

Proposed systems for providing DAB in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing (OFDM) sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, can be separated from a local transmitting station by only 200 KHz. Thus, a particularly significant source of interference in such a system is known as first adjacent analog FM interference. This interference results when a portion of an FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

Symbol interleavers are employed in many communication systems. Interleaving scrambles a signal over a certain time interval. Typically, block interleavers are employed, where a signal is scrambled by writing the symbols into rows and reading them out in columns, in a known manner. Since the interleaver rearranges the ordering of the incoming data on a block-by-block basis, interleaver synchronization techniques are generally employed to allow the receiver to restore the original ordering.

Block interleavers have been utilized in OFDM-based systems due to the simplicity in implementation and data tracking. If block-coded symbols are interleaved over the duration of many blocks before transmission, symbols associated with a lost packet will be deinterleaved by the receiver and found among many different coded blocks. Thus, the number of symbol errors that may occur in each coded block is reduced, and the likelihood that a selected block code will correct all symbol errors in a transmitted signal is correspondingly increased.

Thus, in OFDM-based communication systems, and especially in the IBOC case, the de-interleaver at the receiver has to be synchronized to the interleaver. The required interleaver synchronization mechanism, however, results in delay, overhead information and additional processing. A need therefore exists for an interleaving method and apparatus for an OFDM-based communication system that does not require interleaver synchronization between the transmitter and receiver. A further need exists for an interleaving method and apparatus for an OFDM-based communication system that eliminates additional overhead information and reduces the complexity and processing for symbol interleaving.

SUMMARY OF THE INVENTION

Generally, interleaving methods and apparatus are disclosed for digital audio broadcasting (DAB) systems, such as in-band on-channel (IBOC) DAB systems using orthogonal frequency division multiplexing (OFDM). According to one aspect of the invention, the disclosed interleaver method and apparatus utilize a convolutional interleaver to interleave a signal over a particular time interval. The disclosed convolutional interleaver has a row size of one OFDM symbol (or the number of active sub-carriers in the applicable sub-band of the IBOC system) and a time span of arbitrary size.

The disclosed interleaving method provides the information necessary to decode a given frame to the receiver as of the time the given frame is received. Thus, the receiver can begin sorting and decoding the received symbol immediately, without waiting for the start of a new interleaver block. Thus, the self-synchronizing nature of the present invention permits a receiver in a DAB system to start sorting the scrambled block and descrambling the received symbols according to its own frame count, without regard to the frame count of the transmitter. In this manner, the disclosed interleaving method and apparatus does not require interleaver synchronization between the transmitter and receiver, while reducing the delay between the transmitter and receiver and memory requirements by fifty percent, relative to synchronized block interleaver implementations.

According to another aspect of the invention, separate convolutional encoders and convolutional interleavers can be applied to each sub-band in a multi-stream structure. Thus, the present invention provides independent error spreading for each sub-band.

A more complete understanding of the present invention, as well as further features and advantages of the present invention, will be obtained by reference to the following detailed description and drawings.

DETAILED DESCRIPTION

The interleaving method and apparatus of the present invention utilizes a convolutional interleaver. The disclosed convolutional interleaver is the size of one OFDM symbol and has a time span of arbitrary size. According to one feature of the present invention, the variable delay normally associated with convolutional interleavers is addressed using a structured memory block having a row size of one OFDM symbol. In other words, the row length corresponds to the number of active sub-carriers in the applicable sub-band of the IBOC system.

A convolutional interleaver provides the information necessary to decode a given frame to a receiver as of the time the given frame is received. Thus, unlike block interleavers, a receiver in the DAB system of the present invention can begin sorting and decoding the received symbol immediately, without waiting for the start of an interleaver block. The self-synchronizing nature of the present invention permits a receiver in an OFDM-based IBOC system to start sorting the scrambled block and descrambling the received symbols according to its own frame count, without regard to the frame count of the transmitter. The interleaving method and apparatus for an OFDM-based communication system thus does not require interleaver synchronization between the transmitter and receiver, while reducing the delay between the transmitter and receiver and memory requirements by fifty percent, relative to synchronized block interleaver implementations.

Figure 1:
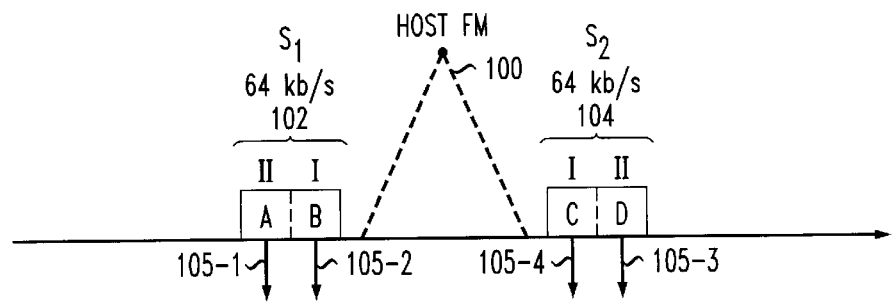
FIG. 1 shows a portion of a frequency spectrum in an exemplary HIBOC DAB system in accordance with the present invention.

FIG. 1 illustrates a portion of a frequency spectrum in an exemplary FM HIBOC DAB system, plotted with the power, P, as a function of frequency, f. It is noted that the present invention likewise applies to an AM HIBOC DAB system, as would be apparent to a person of ordinary skill in the art. The portion of the spectrum shown in FIG. 1 includes an analog host FM signal 100 with associated lower digital side band 102 and upper digital side band 104. The side bands represent portions of the frequency spectrum used to transmit digital audio information in the HIBOC DAB system.

In the exemplary FM HIBOC DAB system of FIG. 1, an audio signal is first encoded using a multi-descriptive coding technique to produce two streams $S_1$ and $S_2$. The streams $S_1$ and $S_2$ are transmitted on host FM signal 100 as side-bands 102 and 104, respectively. The transmission of multi-descriptive streams $S_1$ and $S_2$ in different frequency bands provides both information diversity and frequency diversity.

The two streams $S_1$ and $S_2$ are then divided into two classes, class I (core) and class II (enhancement), using a bit stream classifier. Class I bits represent the more important audio bits, and may be provided with a higher level of error protection, for example, by associating them with innermost sub-bands B, C, i.e., the sub-bands which are less susceptible to first adjacent channel interference. Class II bits, which have been determined to be of lesser importance to reconstructed audio quality than the class I bits, are provided with a lower level of error protection, for example, by associating them with innermost sub-band A, D, i.e., the sub-bands which are more susceptible to first adjacent channel interference. Performance gains are obtained from this type of error protection by exploiting interference variations across the side bands. Other error protection techniques, such as providing a higher transmission power for sub-bands B and C than for sub-bands A and D may also be used.

The system in the illustrative embodiment, discussed further below, uses an outer cyclic redundancy code (CRC), and differential quadrature phase shift keyed (DQPSK)/OFDM modulation to encode sub-bands A, B, C, D. This arrangement results in a total of four different bitstreams 105-1 through 105-4. As discussed further below in conjunction with FIGS. 2 and 4, the present invention applies a separate interleaver/deinterleaver to each of the four sub-bands in the multi-stream structure. In this manner, the present invention provides independent error spread for each sub-band.

The DQPSK modulation of transmitted symbols provides robustness to frequency-selective fading and oscillator phase drift. The differential encoding is performed in frequency between OFDM tones. The digital signal to be transmitted and the outer CRC block code are repeated in each of the side bands 102, 104. Each of the side bands can include N components (not shown) that may represent, for example, sets of orthogonal frequency division multiplexed (OFDM) sub-carriers.

Figure 2:
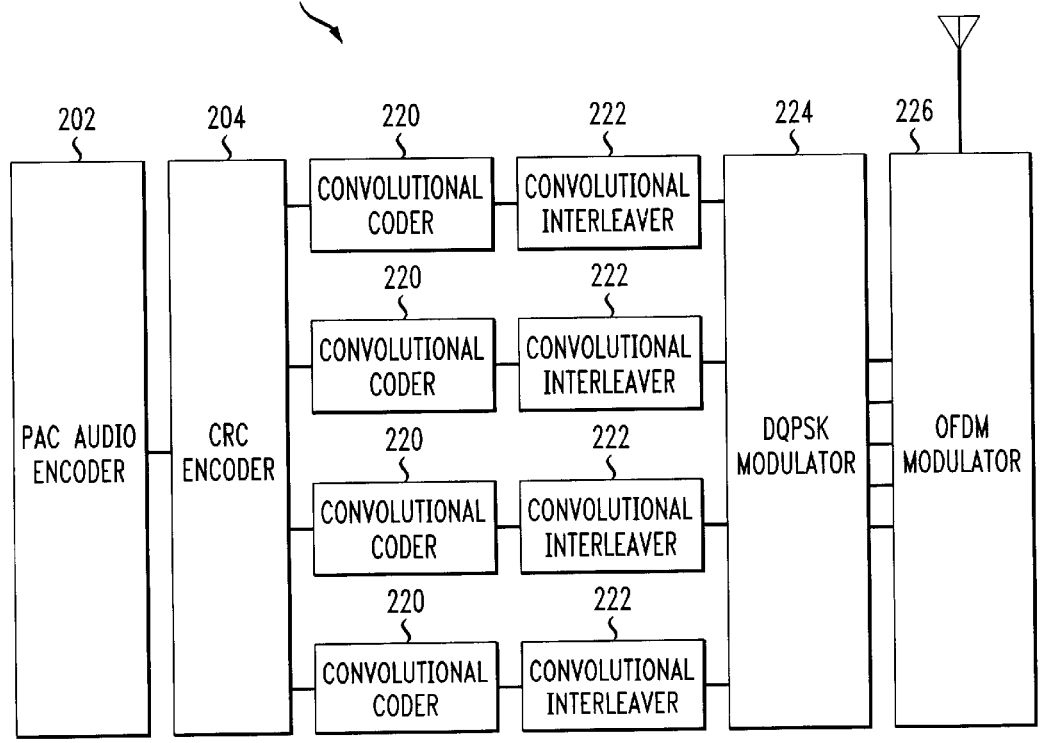
FIG. 2 is a schematic block diagram of a transmitter in an exemplary HIBOC DAB system in which the present invention may be implemented.
Figure 3:
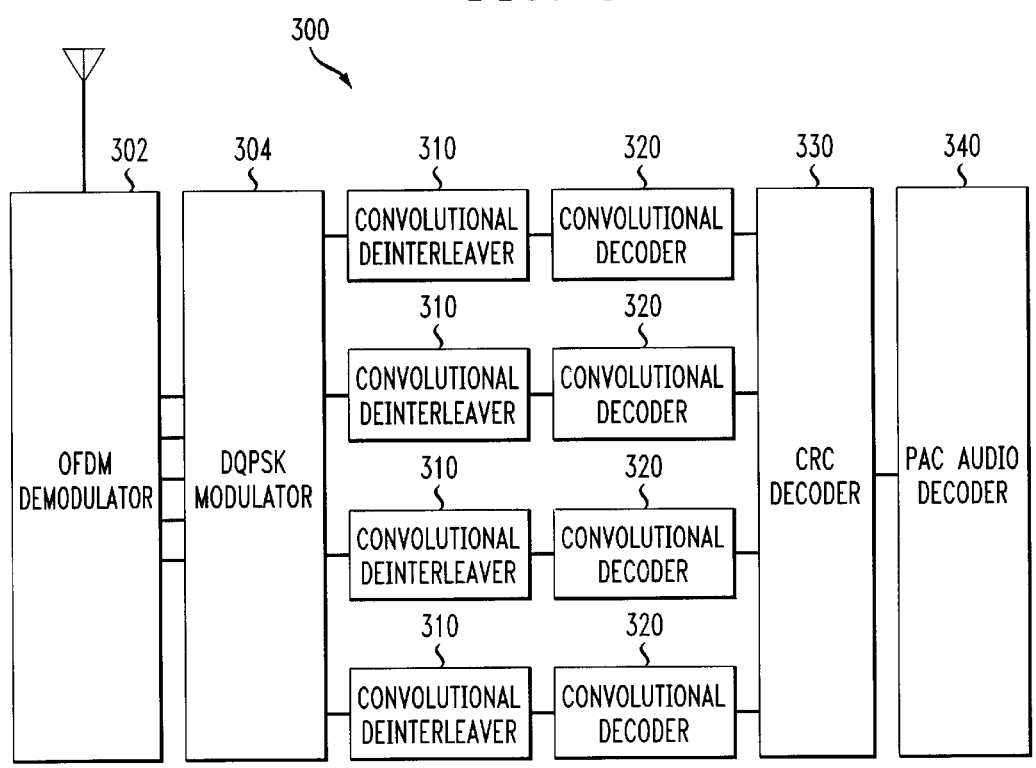
FIG. 3 illustrates the format of a signature OFDM frame in accordance with the present invention.

FIG. 2 shows an exemplary transmitter 200 in an FM HIBOC DAB system in which the invention may be implemented. The FM HIBOC DAB system includes the transmitter 200 and a receiver 300, discussed below in conjunction with FIG. 3. It should be noted that FIGS. 2 and 3 show only the digital portion of the system, i.e., the portions associated with generation and processing of the digital signals. Additional conventional processing elements may be used to process the analog signals. For a more detailed discussion of a conventional orthogonal frequency division multiplexing (OFDM) system, see, for example, W.Y. Zou and Y. Wu, "COFDM —An Overview," IEEE Trans. Broadcasting, Vol. 41, No. 1, 1–8 (March 1995) or J.A.C. Bingham, "Multicarrier Modulation for Data Transmission: An Idea Whose Time Has Come," IEEE Comm., 5–14 (May 1990), each incorporated by reference herein.

Generally, a PAC audio coder 202 generates an encoded audio signal at a bit rate which may vary up to 128 kbps using the audio compression techniques described, for example, in D. Sinha, J. D. Johnston, S. Dorward and S. R. Quackenbush, "The Perceptual Audio Coder," in Digital Audio, Section 42, pp. 42-1 to 42-18, CRC Press, 1998, incorporated by reference herein. The encoded audio bit stream is applied to a CRC encoder 204, which generates CRC bits in a conventional manner using a CRC error detecting block code. CRC is an example of one type of "outer code" that may be used in the system 200. Other possible outer codes include, for example, Reed-Solomon (RS) codes, Bose-Chadhuri-Hocquenghem (BCH) codes, and other block codes.

As shown in FIG. 2, the FM HIBOC DAB transmitter 200 also includes a convolutional coder 220 for coding the audio bitstream in accordance with well-known channel coding techniques. In addition, the FM HIBOC DAB system 200 includes an interleaver 222, a DQPSK modulator 224, and an OFDM modulator 226. The convolutional coding in coder 220 is an example of a type of "inner code" that may be used in the system 200. Other types of inner codes may also be used, including block or convolutional codes, so-called "turbo" codes, and coding associated with trellis coded modulation. The modulated output of the OFDM modulator 226, which corresponds to the digital side bands 102 and 104, is transmitted through an FM broadcast channel 230 to a receiver (not shown). The DQPSK modulator 224 processes the interleaved bit stream to generate two bits for each QPSK symbol, which are then mapped to the appropriate sub-carrier by the OFDM modulator 226.

As previously indicated, the present invention applies a separate convolutional encoder 220 and convolutional interleaver 222 to each of the four sub-bands A, B, C, D in the multi-stream structure. In this manner, the present invention provides independent error spreading for each sub-band. The convolutional interleavers 222 interleave the audio information over time, using information from the frequency domain, in a known manner.

FIG. 3 shows an exemplary receiver 300 in an FM HIBOC DAB system in which the invention may be implemented. The receiver 300 contains elements 302, 304, 310, 320, 330, 340 that perform the inverse function of the corresponding element in the transmitter 200, in a manner well-known to those skilled in the art. Again, according to a feature of the present invention, a separate convolutional deinterleaver 310 and convolutional decoder 320 are applied to each of the four sub-bands A, B, C, D in the multi-stream structure. In this manner, the present invention provides independent error spreading for each sub-band.

Figure 4:
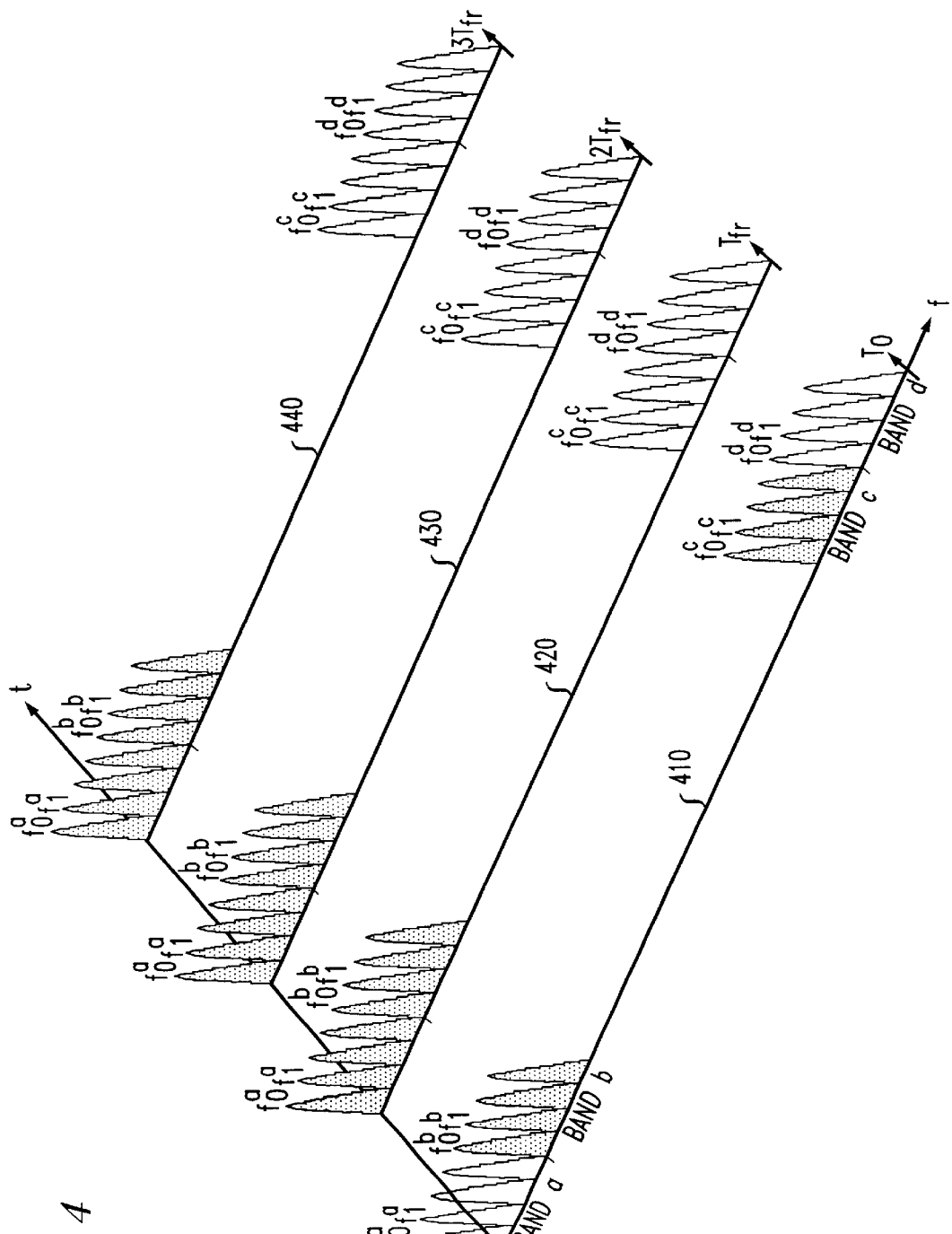
FIG. 4 is a schematic block diagram of an exemplary receiver in an HIBOC DAB system in which the present invention may be implemented.

FIG. 4 illustrates the four sub-bands A, B, C, D as received by a receiver 300, plotted with the power, P, as a function of frequency, f over time, t. Since the convolutional interleaver of the present invention produces a self-synchronized signal, the receiver 300 can start sorting the scrambled block and descrambling the received symbols according to its own frame count, without regard to the frame count of the transmitter. Four frames 410, 420, 430 and 440 of digital audio data as received by the receiver 300 over time, t, are shown in FIG. 4. As the receiver 300 receives each frame, enough information is available for the receiver 300 to begin sorting and decoding the audio information as of the current frame.

It is to be understood that the embodiments and variations shown and described herein are merely illustrative of the principles of this invention and that various modifications may be implemented by those skilled in the art without departing from the scope and spirit of the invention.

I claim:

1. A method of transmitting a digital signal in a digital audio broadcasting (DAB) system, comprising the steps of:
    interleaving bits in said digital signal using a convolutional interleaver having a row size equal to a number of active sub-carriers in a sub-band of an in-band on-channel system;
    mapping said interleaved bits to one or more symbols; and
    transmitting said symbols to a receiver.

2. The method of claim 1, wherein said convolutional interleaver has a row size equal to one OFDM symbol.

3. The method of claim 1, further comprising the step of applying a separate convolutional interleaver to each sub-band in said DAB system.

4. The method of claim 1, further comprising the step of applying a separate coder to each sub-band in said DAB system.

5. A method of receiving a digital signal in a digital audio broadcasting (DAB) system, comprising the steps of:
    receiving transmitted symbols from a transmitter;
    demodulating said symbols to generate interleaved bits; and
    de-interleaving said interleaved bits using a convolutional de-interleaver having a row size equal to a number of active sub-carriers in a sub-band of an in-band on-channel system.

6. The method of claim 5, wherein said convolutional interleaver has a row size equal to one OFDM symbol.

7. The method of claim 5, wherein said de-interleaver sorts a scrambled block and descrambles said received symbols without regard to a frame count of said transmitter.

8. The method of claim 5, further comprising the step of applying a separate convolutional de-interleaver to each sub-band in said DAB system.

9. The method of claim 5, further comprising the step of applying a separate decoder to each sub-band in said DAB system.

10. The method of claim 5, further comprising the steps of sorting and decoding said received symbols in the frequency domain over time, without regard to a frame count of said transmitter.

11. A transmitter in a digital audio broadcasting (DAB) system, comprising:
    a convolutional interleaver for interleaving bits in said digital signal, said convolutional interleaver having a row size equal to a number of active sub-carriers in a sub-band of an in-band on-channel system;
    a bit-to-symbol mapper for mapping said interleaved bits to one or more symbols; and
    an OFDM modulator for transmitting said symbols to a receiver.

12. The transmitter of claim 11, wherein said convolutional interleaver has a row size equal to one OFDM symbol.

13. The transmitter of claim 11, further comprising a separate convolutional interleaver for each sub-band in said DAB system.

14. The transmitter of claim 11, further comprising a separate coder for each sub-band in said DAB system.

15. A receiver in a digital audio broadcasting (DAB) system, comprising:
    an OFDM demodulator for receiving transmitted symbols from a transmitter;
    a symbol-to-bit mapper for demodulating said symbols to generate interleaved bits; and
    a convolutional de-interleaver for de-interleaving said interleaved bits, said convolutional interleaver having a row size equal to a number of active sub-carriers in a sub-band of an in-band on-channel system.

16. The receiver of claim 15, wherein said convolutional interleaver has a row size equal to one OFDM symbol.

17. The receiver of claim 15, wherein said de-interleaver sorts a scrambled block and descrambles said received symbols without regard to a frame count of said transmitter.

18. The receiver of claim 15, further comprising a separate convolutional deinterleaver for each sub-band in said DAB system.

19. The receiver of claim 15, further comprising a separate decoder for each sub-band in said DAB system.

20. The receiver of claim 15, wherein said receiver sorts and decodes said received symbols in the frequency domain over time, without regard to a frame count of said transmitter.

* * * * *

UNITED STATES PATENT AND TRADEMARK OFFICE
CERTIFICATE OF CORRECTION

PATENT NO. : 6,985,537 B1
DATED : January 10, 2006
INVENTOR(S) : Milbar

It is certified that error appears in the above-identified patent and that said Letters Patent is hereby corrected as shown below:

<u>Title page,</u>
Item [56], References Cited, U.S. PATENT DOCUMENTS, insert the following:
-- 4,667,626    6/1987        Betts et al.
   5,610,908    3/1997        Shelswell et al.
   5,862,189    1/1999        Huisken et al. --.

Signed and Sealed this

Thirtieth Day of May, 2006

JON W. DUDAS
*Director of the United States Patent and Trademark Office*